(12) United States Patent
Lee et al.

(10) Patent No.: US 12,537,912 B2
(45) Date of Patent: Jan. 27, 2026

(54) IMAGE PROCESSING DEVICE AND METHOD

(71) Applicant: Samsung Electronics Co., Ltd., Suwon-si (KR)

(72) Inventors: Junsoo Lee, Suwon-si (KR); Junyoung Moon, Suwon-si (KR); Han-Soo Seong, Suwon-si (KR); Junggoo Lee, Suwon-si (KR); Jongwhan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/913,206

(22) Filed: Oct. 11, 2024

(65) Prior Publication Data

US 2025/0220134 A1    Jul. 3, 2025

(30) Foreign Application Priority Data

Dec. 28, 2023   (KR) .................. 10-2023-0195613

(51) Int. Cl.
*H04N 7/01*    (2006.01)
*H04N 7/035*   (2006.01)
*H04N 9/67*    (2023.01)

(52) U.S. Cl.
CPC ............. *H04N 7/0352* (2013.01); *H04N 7/01* (2013.01); *H04N 9/67* (2013.01)

(58) Field of Classification Search
CPC .......... H04N 7/01; H04N 5/04; H04N 7/0352; H04N 9/76; H04N 9/67; H04N 9/74; H04N 9/64; H04N 9/44; H04N 11/20

USPC ....... 348/453, 441, 500, 659, 705, 464, 598, 348/599, 660, 661

See application file for complete search history.

(56) References Cited

U.S. PATENT DOCUMENTS

| | | |
|---|---|---|
| 4,918,523 A | 4/1990 | Simon et al. |
| 5,159,460 A | 10/1992 | Senso |
| 6,177,922 B1 * | 1/2001 | Schiefer ................. H04N 7/01 348/441 |
| 7,446,819 B2 | 11/2008 | Kim et al. |
| 8,264,610 B2 | 9/2012 | Garg et al. |
| 9,515,763 B2 | 12/2016 | Honda et al. |

FOREIGN PATENT DOCUMENTS

| | | |
|---|---|---|
| CN | 110312158 B | 1/2022 |
| JP | 5180910 B2 | 4/2013 |
| KR | 10-0185165 B1 | 5/1999 |
| KR | 10-1425221 B1 | 2/2009 |
| KR | 10-2023-0032202 A | 3/2023 |

* cited by examiner

*Primary Examiner* — Sherrie Hsia
(74) *Attorney, Agent, or Firm* — Fish & Richardson P.C.

(57) ABSTRACT

An image processing device includes a channel interface, including a data channel, a vertical synchronization line, a horizontal synchronization line, and a data enable line, and a combiner configured to convert N pieces of first image data (where N is a positive integer greater than or equal to 2) into second image data having a different image format, time-divide and output the second image data to the data channel, output N vertical synchronization signals for the second image data to the vertical synchronization line, and output N data enable signals for the second image data to the horizontal synchronization line and the data enable line.

20 Claims, 14 Drawing Sheets

IMAGE PROCESSING DEVICE AND METHOD

CROSS-REFERENCE TO RELATED APPLICATION(S)

This U.S. non-provisional application claims priority under 35 USC § 119 to Korean Patent Application No. 10-2023-0195613, filed on Dec. 28, 2023, in the Korean Intellectual Property Office, the disclosure of which is herein incorporated by reference in its entirety.

BACKGROUND

Example embodiments relate to image processing device and method.

In the past, video output devices such as TVs functioned solely as displays for watching broadcasts. However, the roles of video output devices have gradually expanded over time. For example, video output devices are now required to provide contents for home entertainment, such as games and exercise, in combination with Internet and applications. To provide a variety of contents, video output devices need to receive digital data from broadcasts, Internet, or other sources, and generate and process video data from the received digital data.

A video output device may include an image processing device to generate and process video data. The image processing device may include a plurality of unit modules to perform various functions, and it may be required to transmit and receive a larger number of pieces of video data using an existing channel interface between the unit modules.

SUMMARY

Example embodiments provide image processing device and method for transmitting and receiving a larger number of pieces of image data using a channel interface, without increasing the number of bit lines in the channel interface. According to at least some example embodiments, when an RGB format is converted into a VCbCr 422 format and a data line of 16 bits (=8 bits*2) is transmitted instead of an existing data line of 24 bits (=8 bits*3), 8 bits of spare data may be generated, and the 8 bits may be used to transmit a larger number of video channels than conventional systems allow.

According to an example embodiment, an image processing device includes a channel interface, including a data channel, a vertical synchronization line, a horizontal synchronization line, and a data enable line, and a combiner configured to convert N pieces of first image data (where N is a positive integer greater than or equal to 2) into second image data having a different image format, time-divide and output the second image data to the data channel, output N vertical synchronization signals for the second image data to the vertical synchronization line, and output N data enable signals for the second image data to the horizontal synchronization line and the data enable line.

According to an example embodiment, an image processing device includes a channel interface including a data channel, a vertical synchronization line, a horizontal synchronization line, and a data enable line, a combiner configured to convert N pieces of first image data (where N is a positive integer greater than or equal to 2) into second image data having a different image format, time-divide and output the second image data to the data channel, output N vertical synchronization signals for the second image data to the vertical synchronization line, and output N data enable signals for the second image data to the horizontal synchronization line and the data enable line, and a splitter configured to receive the second image data through the data channel, receive the N vertical synchronization signals through the vertical synchronization line, and receive the N data enable signals through the horizontal synchronization line and the data enable line.

According to an example embodiment, a method performed by an image processing device includes converting N pieces of first image data (where N is a positive integer greater than or equal to 2) into second image data having a different image format and time-dividing and outputting the second image data to a data channel, outputting N vertical synchronization signals for the second image data to a vertical synchronization line, and outputting N data enable signals for the second image data to a horizontal synchronization line and a data enable line.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, example embodiments will be described with reference to the accompanying drawings.

Figure 1:
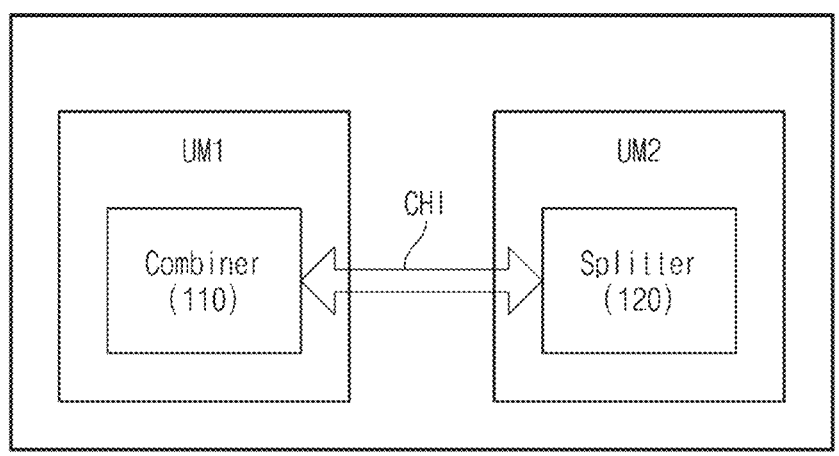
FIG. 1 is a diagram illustrating an image processing device according to some example embodiments.

FIG. 1 is a diagram illustrating an image processing device according to some example embodiments.

Referring to FIG. 1, an image processing device 100 may be configured to perform all image processing operations on image data. The image processing device 100 may be implemented in hardware or a combination of hardware and software.

According to some example embodiments, the image processing device 100 may be implemented as various types of processors, such as a central processing unit (CPU), a graphics processing unit (GPU), a microprocessor, a multimedia processor, or an application processor. Alternatively, a display controller may be implemented as an integrated circuit (IC) or a system-on-chip (SoC).

The image processing device 100 may include a plurality of unit modules UM1 and UM2. The unit modules UM1 and UM2 may transmit and receive image data to and from each other or process the transmitted and received image data, and may be implemented in hardware or a combination of hardware and software. For example, each of the unit modules UM1 and UM2 may decode digital data, received through high definition multimedia interface (HDMI), universal serial bus (USB), Internet, or broadcasting (not illustrated), to generate image data, process image data, or perform an operation of improving picture quality (PQ) of image data, or an operations of outputting image data.

At least a portion of the unit modules UM1 and UM2 may include at least one of a combiner 110 or a splitter 120. For example, in FIG. 1, the first unit module UM1 is illustrated as including a combiner 110 and the second unit module UM2 is illustrated as including a splitter 120. The combiner 110 and the splitter 120 may be connected to each other through a channel interface CHI.

The combiner 110 may convert or combine a plurality of pieces of image data received by the first unit module UM1 into a single piece of image data, and output the converted data through the channel interface CHI. For example, the combiner 110 may serve to transmit image data processed in each of the unit modules UM1 and UM2. The splitter 120 may receive the converted image data through the channel interface CHI and convert the received image data back to the plurality of pieces of original image data. For example, the splitter 120 may serve to receive image data to be processed in each of the unit modules UM1 and UM2.

According to example embodiments, a unit module that does not require transmission and reception of image data may not include the combiner 110 and the splitter 120.

Figure 2:
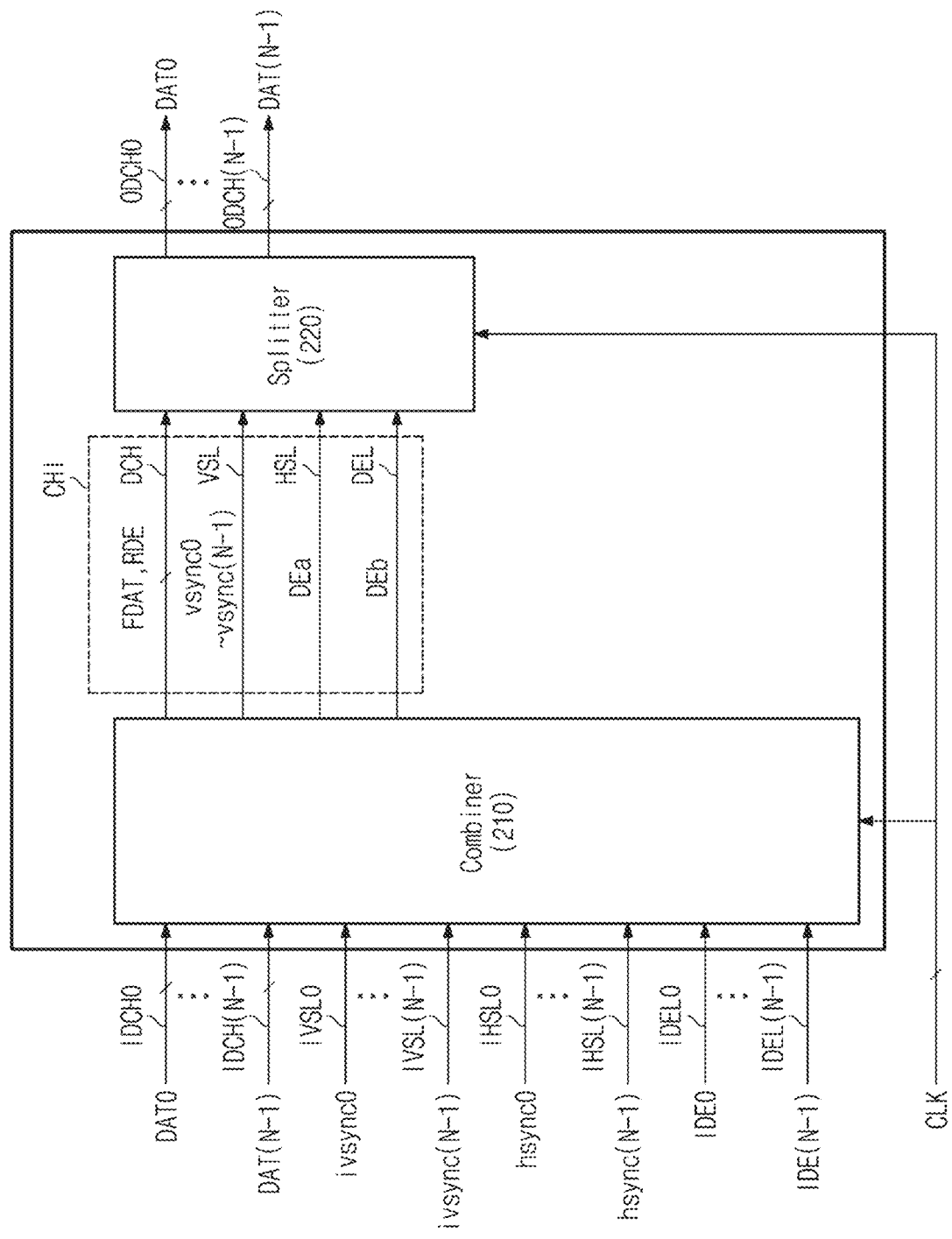
FIG. 2 is a diagram illustrating an image processing device according to some example embodiments in more detail.

FIG. 2 is a diagram illustrating an image processing device according to some example embodiments in more detail.

Referring to FIG. 2, a combiner 210 according to some example embodiments may receive various types of data through input data channels IDCH0 to IDCHN−1, input vertical synchronization lines IVSL0 to IVSLN−1, input horizontal synchronization lines IHSL0 to IHSLN−1, and input data enable lines IDEL0 to IDELN−1. For example, the input data channels IDCH0 to IDCHN−1, the input vertical synchronization lines IVSL0 to IVSLN−1, the input horizontal synchronization lines IHSL0 to IHSLN−1, and the input data enable lines IDEL0 to IDELN−1 may be connected to other unit modules or external devices, not illustrated. Although not illustrated, each combiner 210 and each splitter 220 may be provided with a pin, not illustrated, for each of the input data channel IDCH0 to IDCHN−1, the input vertical synchronization lines IVSL0 to IVSLN−1, the input horizontal synchronization lines IHSL0 to IHSLN−1, and the input data enable lines IDEL0 to IDELN−1.

The combiner 210 may receive N pieces of first image data DAT0 to DATN−1 from N input data channels IDCH0 to IDCHN−1, where N is a positive integer greater than or equal to 2). The N pieces of first image data DAT0 to DATN−1 may have the same image format, but may be separately processed in the image processing device 200. For example, each of the N pieces of first image data DAT0 to DATN−1 may be defined such that views output through the display panel are different from each other.

To process the N pieces of first image data DAT0 to DATN−1, the combiner 210 may receive N input vertical synchronization signals ivsync0 to ivsyncN−1 through N input vertical synchronization lines IVSL0 to IVSLN−1 and N input horizontal synchronization signals hsync0 to hsyncN−1 through N input horizontal synchronization lines IHSL0 to IHSLN−1. In example embodiments, a vertical synchronization signal may be an image control signal for matching frame synchronization of image data, and may indicate timing (for example, start timing) of each frame period. A horizontal synchronization signal may be a video control signal for matching horizontal synchronization within the same frame of image data, and may indicate timing (for example, start timing) of each horizontal time within a frame.

In addition, the combiner 210 may receive N input data enable signals IDE0 to IDEN−1 for the N pieces of first image data DAT0 to DATN−1 through N input data enable lines IDEL0 to IDELN−1. In example embodiments, a data enable signal may include a valid period for a frame. For example, the data enable signal may indicate the start or end of the valid period of any image data.

The combiner 210 may combine N pieces of first image data DAT0 to DATN−1 and convert the combined data into second image data FDAT having a different image format. For example, the combiner 210 may convert the second image data FDAT to have a smaller size image format than the first image data DAT0 to DATN−1. The second image data FDAT may have a size smaller than a transmittable size of the data channel DCH included in the channel interface CHI based on the converted image format. The N pieces of first image data DAT0 to DATN−1 may be combined to be converted into the second image data FDAT based on the conversion of the image format.

The combiner 210 may time-divide the second image data FDAT having the converted image format and output the time-divided data to the data channel DCH. For example, the converted second image data FDAT may include a region corresponding to each of the N pieces of first image data DAT0 to DATN−1. The combiner 210 may time-divide each region through a data channel DCH and sequentially output the time-divided regions. Accordingly, unlike the first image data DAT0 to DATN−1 received through the plurality of input data channels IDCH0 to IDCHN−1, the combiner 210 may output the second image data FDAT without using N data channels DCH.

In order for the second image data FDAT to be later converted back into the N pieces of first image data DAT0 to DATN−1 that may be identified from each other through the splitter 220, the combiner 210 may output N vertical synchronization signals vsync0 to vsyncN−1 and N data enable signals DEa, DEb, and RDE through the channel interface CHI.

According to some example embodiments, the combiner 210 may generate and output individually identifiable vertical sync signals vsync0 to vsync(N−1) from the input vertical sync signals ivsync0-ivsync(N−1) for the converted second image data (FDAT). Alternatively, when the input vertical synchronization signals ivsync0 to ivsyncN−1 input to the combiner 210 are already configured to be identifiable from each other, the combiner 210 may also output the same vertical synchronization signals vsync0 to vsyncN−1 as the input vertical synchronization signals ivsync0 to ivsyncN−1.

According to some example embodiments, the combiner 210 may output N vertical synchronization signals vsync0 to vsyncN−1 for the second image data FDAT to a vertical synchronization line VSL. For example, the combiner 210 may output N vertical synchronization signals vsync0 to vsyncN−1 through a single vertical synchronization line VSL included in the channel interface CHI, rather than outputting the N vertical synchronization signals vsync0 to vsyncN−1 to different vertical synchronization lines VSL. The combiner 210 may output the N vertical synchronization signals vsync0 to vsyncN−1, output through the vertical synchronization line VSL, such that the output signals vsync0 to vsyncN−1 may be identified from each other by the splitter 220.

According to some example embodiments, for time-division output of the converted second image data FDAT, the combiner 210 may generate and output data enable signals DEa, DEb, and RDE for time-division output from the input data enable signals IDE0 to IDEN−1. Alternatively, when the input data enable signals IDE0 to IDEN−1 input to the combiner 210 are already configured for time division, the combiner 210 may also output the same data enable signals DEa, DEb, and RDE as the input data enable signals IDE0 to IDEN−1.

According to some example embodiments, the combiner 210 may output N data enable signals DEa, DEb, and RDE for the second image data FDAT to a horizontal synchronization line HSL and a data enable line DEL included in the channel interface CHI. For example, the combiner 210 may output a first data enable signal DEa corresponding to one of the N data enable signals DEa, DEb, and RDE to a horizontal synchronization line HSL and omit an output of the horizontal synchronization signal hsync0 to hsyncN−1. In addition, the combiner 210 may output a second data enable signal Deb, different from the first data enable signal DEa, to the data enable line DEL for the data enable signal.

The combiner 210 may output the first data enable signal DEa and the second data enable signal DEb to the horizontal synchronization line HSL and the data enable line DEL, and a remaining data enable signal RDE, among the N data enable signals, may be output to the data channel DCH. The data channel DCH may be configured to transmit a plurality of pieces of data, and the combiner 210 may output the second image data FDAT and the remaining data enable signal RDE together through the data channel DCH.

As a result, the combiner 210 may time-divide and output a plurality of pieces of first image data DAT0 to DATN−1 to a single data channel DCH to output multiple first image data DAT0 to DATN−1 to the splitter 220 through a single channel interface CHI. In addition, the combiner 210 may output a plurality of vertical synchronization signals vsync0 to vsyncN−1, required to transmit the plurality of pieces of first image data DAT0 to DATN−1, to be individually identifiable. To output the plurality of data enable signals DEa, DEb, and RDE required to transmit the plurality of pieces of first image data DAT0 to DATN−1, the combiner 210 may output one of the data enable signals to the horizontal synchronization line HSL without outputting the horizontal synchronization signal hsync0 to hsyncN−1 on the horizontal synchronization line HSL (for example, by omitting the horizontal synchronization signals hsync0 to hsyncN−1). Additionally, the combiner 210 may output the remaining data enable signal RDE through the data channel DCH.

According to the above-described embodiments, the combiner 210 may output second image data FDAT and related control signals (for example, the vertical synchronization signals vsync0 to vsync(N−1) and the data enable signal) corresponding to the plurality of pieces of first image data DAT0 to DATN−1) through a single channel interface CHI including a data channel DCH, a vertical synchronization line VSL, a horizontal synchronization line HSL, and a data enable line DEL, without any additional lines, channels, or interfaces between the combiner 210 and the splitter 220.

No additional lines, channels, or interfaces are required, so that a larger number of pieces of data may be transmitted without increasing the number of pins, not illustrated, connected between unit modules. An increase in the number of pins may lead to difficulty in connecting the unit modules and an increase in the size of the image processing device 200, but issues such as difficulty in connection or an increase in size may be prevented according to example embodiments.

The splitter 220 may receive the second image data FDAT, the plurality of vertical synchronization signals vsync0 to vsyncN−1, and the plurality of data enable signals DEa, DEb, and RDE from the combiner 210 through the channel interface CHI. For example, the splitter 220 may receive the second image data FDAT, converted to have a different image format, from N pieces of first image data DAT0 to DATN−1 (where N is a positive integer greater than or equal to 2), receive N vertical synchronization signals vsync0 to vsyncN−1 for the second image data FDAT through the vertical synchronization line VSL, and receive N data enable signals DEa, DEb, and RDE for the second image data FDAT through the horizontal synchronization line HSL and the data enable line DEL.

The splitter 220 may decode the second image data FDAT based on the vertical synchronization signals vsync0 to vsyncN−1 and the data enable signal to obtain N pieces of first image data DAT0 to DATN−1.

The splitter 220 may output the N pieces of first image data DAT0 to DATN−1 through the plurality of output data channels ODCH0 to ODCHN−1.

Similarly to the combiner 210, the splitter 220 may receive and decode the N pieces of first image data DAT0 to DATN−1 through a single channel interface CHI.

A clock signal CLK may be commonly applied to the combiner 210 and the splitter 220. The combiner 210 may convert or output the first image data DAT0 to DATN−1 to the second image data FDAT based on the clock signal CLK. Similarly, the splitter 220 may receive the second image data FDAT or decode the second image data FDAT into the first image data DAT0 to DATN−1 based on the clock signal CLK.

Figure 3:
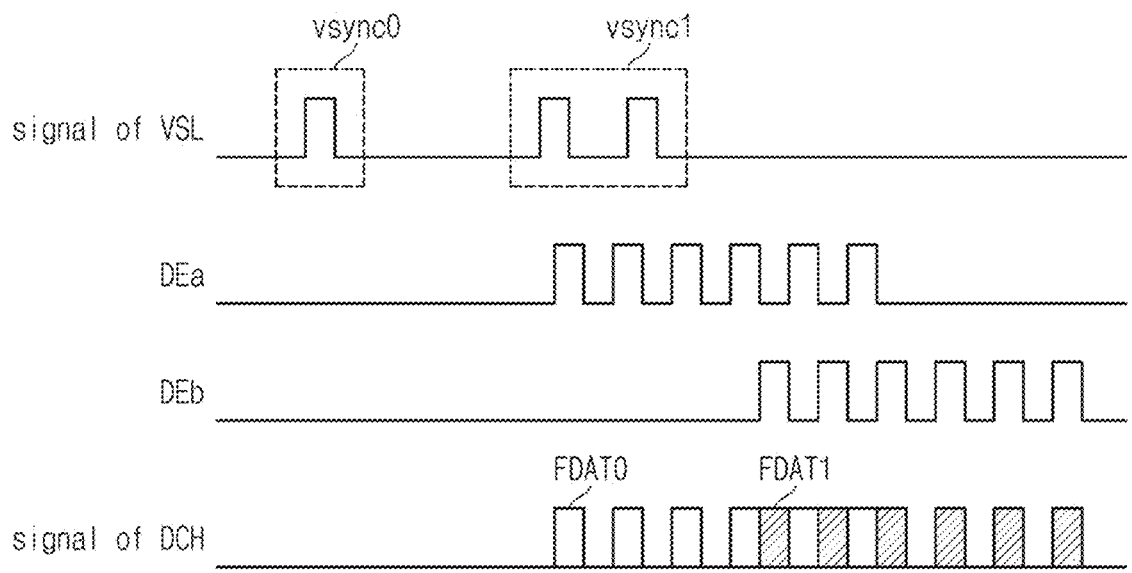
FIG. 3 is a diagram illustrating waveforms of signals transmitted through a channel interface according to some example embodiments.

FIG. 3 is a diagram illustrating waveforms of signals transmitted through a channel interface according to some example embodiments. In FIG. 3, two pieces of first image data (for example, N=2) are illustrated as being input to a combiner, but example embodiments are not limited thereto.

Referring to FIG. 3, a first vertical synchronization signal vsync0 and a second vertical synchronization signal vsync1 required for the two first image data may be transmitted through a vertical synchronization line. As described above, the combiner may output a plurality of vertical synchronization signals on a single vertical synchronization line VSL, but may output the synchronization signals to be identified. For example, as illustrated in the drawing, the first vertical synchronization signal vsync0 may have a single pulse and the second vertical synchronization signal vsync1 may have two pulses, so that the first vertical synchronization signal vsync0 and the second vertical synchronization signal vsync1 may be distinguished from each other.

In addition, a first data enable signal DEa having a plurality of pulses may be output, and a second data enable signal DEb having a plurality of pulses may be output in the same manner after the first data enable signal DEa starts on a time domain. In some embodiments, an interval in which each data enable signal has a specific value (for example, logic high) may correspond to the above-described valid interval. For example, specific image data may be valid in a valid interval of a certain data enable signal. For example, the combiner may output the first data enable signal DEa and the second data enable signal DEb to be time-divided, as illustrated in the drawing.

In addition, converted second image data FDAT0 and FDAT1 of the plurality of first image data may be output through the data channel DCH. The second image data FDAT0 and FDAT1 may include 2-1-th image data FDAT0 corresponding to one first image data and a 2-2-th image data FDAT1 corresponding to another first image data. The 2-1-th image data FDAT0 may correspond to the first vertical synchronization signal vsync0 and the first data enable signal DEa, and the 2-2-th image data FDAT1 may correspond to the second vertical synchronization signal vsync1 and the second data enable signal DEb. For example, one of the time-divided 2-1-th image data FDAT0 and 2-2-th image data FDAT1 may be an even signal, and the other may be an odd signal.

The combiner may output the 2-1-th image data FDAT0 in the valid interval of the first data enable signal DEa and the 2-2-th image data FDAT1 in the valid interval of the second data enable signal DEb. In some embodiments, the combiner may time-divide and output the 2-1-th image data FDAT0 and the 2-2-th image data on a single data channel DCH. Accordingly, in the case of FIG. 3, the 2-1-th image data FDAT0 and the 2-2-th image data FDAT1 may be alternately output in a time domain in a specific interval.

As a result, the combiner may time-divide and transmit the 2-1-th image data FDAT0 and the 2-2-th image data FDAT1 based on the first data enable signal DEa transmitted through the horizontal synchronization line HSL and the second data enable signal DEb transmitted through the data enable line DEL.

Figure 4:
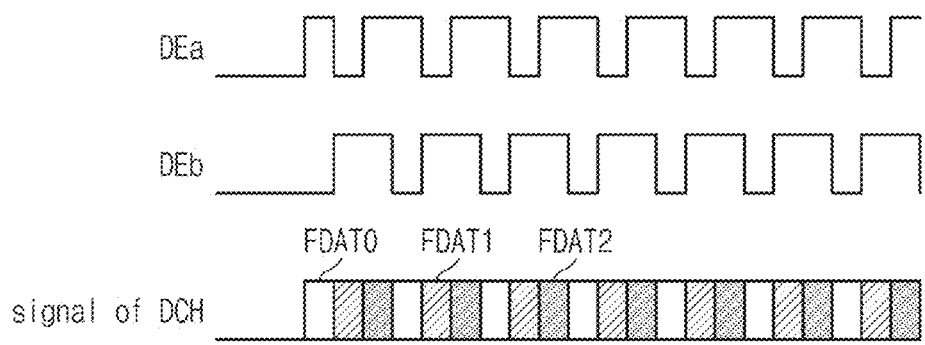
FIG. 4 is a diagram illustrating an example of a second image data output using two data enable signals.

FIG. 4 is a diagram illustrating an example of a second image data output using two data enable signals.

Referring to FIG. 4, unlike FIG. 3 in which the valid intervals of the first data enable signal DEa and the second data enable signal DEb do not overlap each other, the first data enable signal DEa and the second data enable signal DEb may have overlapping valid intervals. Accordingly, when the valid intervals of the first data enable signal DEa and the second data enable signal DEb are defined as logic high and the remaining intervals are defined as logic low, a combination of the first data enable signal DEa and the second data enable signal DEb may represent a total of four logic states.

According to some example embodiments, when N data enable signals are used, the data enable signal may have 2N logic states. Except for the interval in which all data enable signals are logic low, the combiner may output 2N−1 pieces of first image data converted into second image data FDAT through the N data enable signals.

In the case that N=2 as illustrated in FIG. 4, the combiner may output second image data FDAT0 to FDAT2 corresponding to three pieces of first image data through two data enable signals via the data channel DCH. For example, the combiner may time-divide and output the second image data FDAT0 to FDAT2 on a single data channel DCH, so that 2-1-th image data FDAT0, 2-2-th image data FDAT1, and 2-3-th image data FDAT2 may be sequentially output. Each image data may correspond to any one of the logic states. For example, in FIG. 4, the 2-1-th image data FDAT0 may correspond to a logic state of (1, 0), the 2-2-th image data FDAT1 may correspond to a logic state of (0, 1), and the 2-3-th image data FDAT2 may correspond to a logic state of (1, 1).

As a result, the combiner may output a plurality of data enable signals using a data channel DCH, a horizontal synchronization line, and a data enable line, included in the channel interface, according to example embodiments to output a plurality of pieces of first image data converted into second image data FDAT0 to FDAT2.

Figure 5:
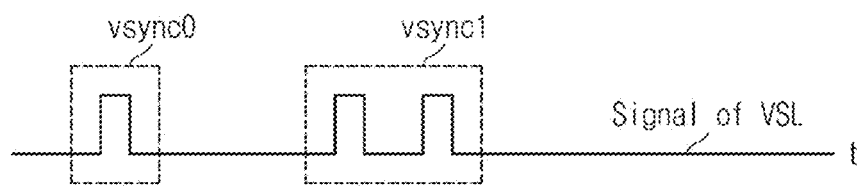
FIGS. 5 and 6 are diagrams illustrating waveforms of a vertical synchronization signal according to some example embodiments.
Figure 6:
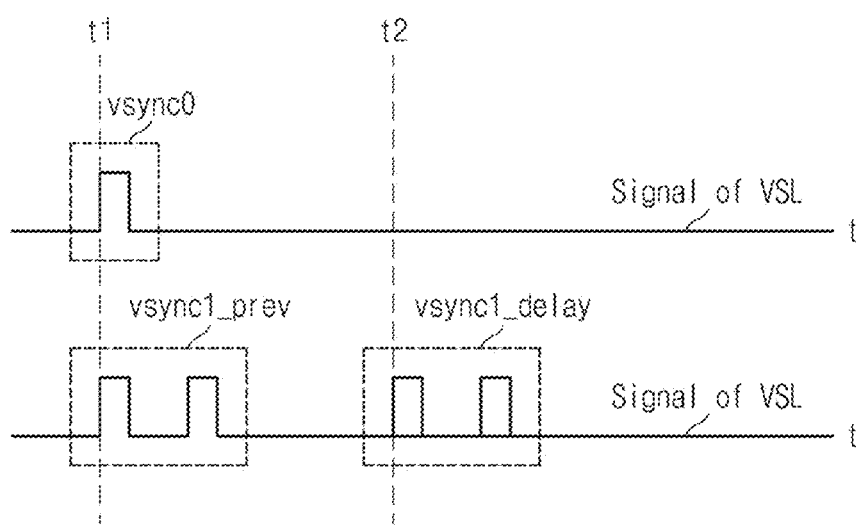

FIGS. 5 and 6 are diagrams illustrating waveforms of a vertical synchronization signal according to some example embodiments.

Referring to FIG. 5, according to some example embodiments, N vertical synchronization signals may have different numbers of pulses according to the above-described embodiments.

For example, to transmit a plurality of vertical synchronization signals to a single vertical synchronization line VSL, the combiner may process the vertical synchronization signals such that each vertical synchronization signal has a different number of pulses (or unit waveforms). For example, the combiner may process the vertical synchronization signals such that the first vertical synchronization signal vsync0 has a single pulse and the second vertical synchronization signal vsync1 has two pulses, as illustrated in FIG. 5.

Alternatively, each vertical synchronization signal may be set and generated to have a different number of waveforms, and the combiner may receive the corresponding vertical synchronization signal through an input vertical synchronization line.

Referring to FIG. 6, the combiner may delay one of the vertical synchronization signals by a predetermined amount of time when a plurality of vertical synchronization signals are simultaneously input through the input vertical synchronization line, for example, when two of the N vertical synchronization signals overlap each other. In some embodiments, the predetermined amount of time for the delay may be preset, or may be set by the combiner, the unit module, an image processing device, or a host, not illustrated, connected to the image processing device of FIG. 1.

For example, when the first vertical synchronization signal vsync0 and the second vertical synchronization signal vsync1 are simultaneously input at a first time point, the combiner may delay the second vertical synchronization signal vsync1_prev from time point t1 to time point t2. For example, the combiner may delay start time of a valid interval of a first pulse of the second vertical synchronization signal vsync1_prev to time point t2. Accordingly, the valid interval of the first pulse of the second vertical synchronization signal vsync1_delay delayed at time point t2 may start.

In addition to the above-described embodiments, the N vertical synchronization signals may be output to be identified with each other through a single vertical synchronization line VSL according to various examples.

The image processing device according to the above-described embodiments may transmit a plurality of vertical synchronization signals through a single vertical synchronization line when the plurality of vertical synchronization signals are required to transmit a plurality of pieces of image data.

Figure 7:
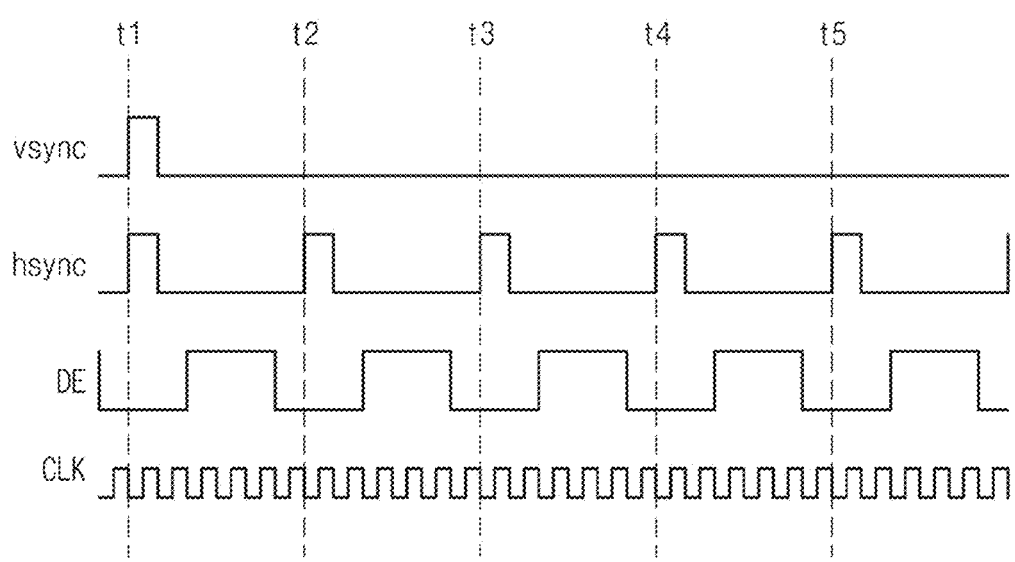
FIG. 7 is a diagram illustrating a decoding operation of an image processing device according to some example embodiments.

FIG. 7 is a diagram illustrating a decoding operation of an image processing device according to some example embodiments.

Referring to FIG. 7, a vertical synchronization signal vsync, a horizontal synchronization signal hsync, and a data enable signal DE may be transmitted through the channel interface (see FIGS. 1 and 2), and a clock signal CLK for the operation of a combiner and a splitter may be transmitted. In some embodiments, the horizontal synchronization signal hsync may have a pulse at each specific time point.

According to some example embodiments, the data enable signal DE may have both a valid interval and a remaining interval (for example, an invalid interval) within an interval in which the horizontal synchronization signal hsync has a pulse, for example, a single period of the horizontal synchronization signal hsync. For example, the data enable signal DE may allow a pulse of the horizontal synchronization signal hsync to arise in the remaining intervals of the data enable signal DE.

In some embodiments, the combiner or the splitter may recognize timing (for example, start timing of each horizontal time) by identifying the remaining interval between the valid intervals of the data enable signal DE based on a clock signal. For example, the combiner or the splitter may recognize timing of each horizontal time without the horizontal synchronization signal hsync. For example, the combiner or the splitter may recognize that the timing of each horizontal time starts when a specific number of clock signal (CLK) pulses are input during the remaining interval of the data enable signal DE.

As a result, the image processing device may recognize timing of the horizontal time of the image data even when omitting transmission of the horizontal synchronization signal hsync through the horizontal synchronization line HSL included in the channel interface CHI. Therefore, according to example embodiments, the horizontal synchronization line HSL included in the channel interface CHI may be used as a line for transmission of the data enable signal DE.

Figure 8:
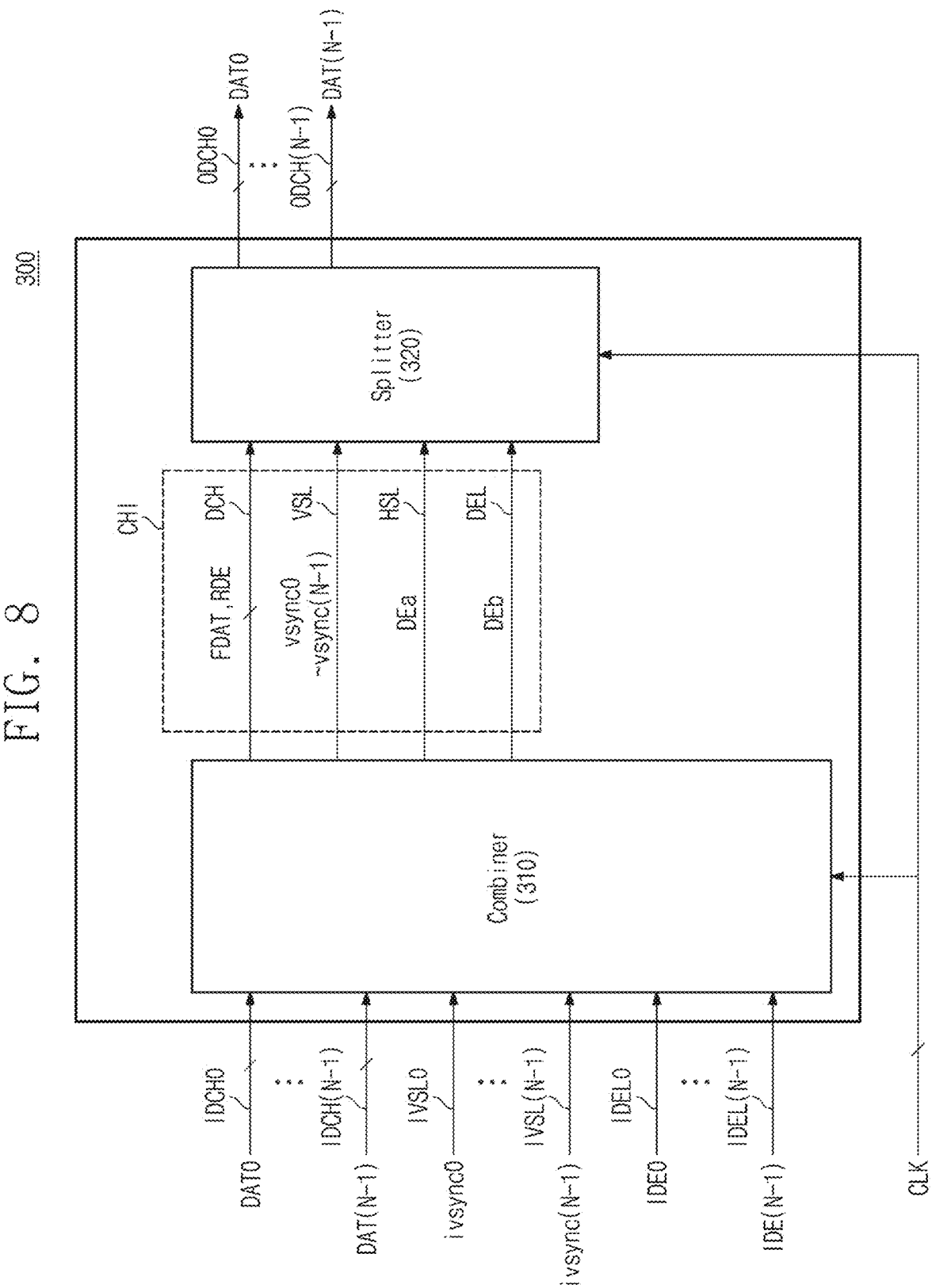
FIG. 8 is a diagram illustrating an image processing device according to some example embodiments in more detail.

FIG. 8 is a diagram illustrating an image processing device according to some example embodiments in more detail. Hereinafter, redundant descriptions thereof will be omitted.

Referring to FIG. 8, a combiner 310 included in an image processing device 300 may not receive a plurality of horizontal synchronization signals, unlike the description provided in FIG. 2. For example, the input horizontal synchronization lines IHSL0 to IHSLN−1 of FIG. 2 may be omitted or deactivated.

As described above, the combiner 310 or the splitter 320 may not require a horizontal synchronization signal for combining or decoding image data. Unlike the description provided in FIG. 2 in which a horizontal synchronization signal is first received through the combiner 310, the combiner 310 of FIG. 8 may omit reception of the horizontal synchronization signal.

Except that the horizontal synchronization signal is not input to the combiner 310, the combiner 310 and the splitter 320 may operate in the same manner as in FIG. 2. The combiner 310 may output N pieces of first image data DAT0 to DATN−1, received through the input data channels IDCH0 to IDCHN−1, through the data channel DCH, output N vertical synchronization signals vsync0 to vsync(N−1) corresponding to the N input vertical synchronization signals ivsync0 to ivsync(N−1), received through input vertical synchronization lines IVSL0 to IVSL(N−1), through a single vertical synchronization line VSL, and output N data enable signals DEa, DEb, and RDE corresponding to the N input data enable signals IDE0 to IDE (N−1) received through the input data enable lines IDEL0 to IDEL(N−1) through a horizontal synchronization line HSL, a data enable line DEL, and a data channel DCH. For example, the combiner 310 may output a single data enable signal DEa, rather than the horizontal synchronization signal whose reception is omitted, through the horizontal synchronization line HSL.

The splitter 320 may receive each signal through the channel interface CHI, decode the second image data FDAT based on a clock signal, and output the obtained N pieces of first image data DAT0 to DATN−1 through N output data channels ODCH0 to ODCHN−1.

The image processing device according to the above-described embodiments may reduce an interface required for transmission and reception of the horizontal synchronization signal by omitting the transmission and reception of the horizontal synchronization signal, and may use the horizontal synchronization line to transmit another signal (for example, a data enable signal).

Figure 9:
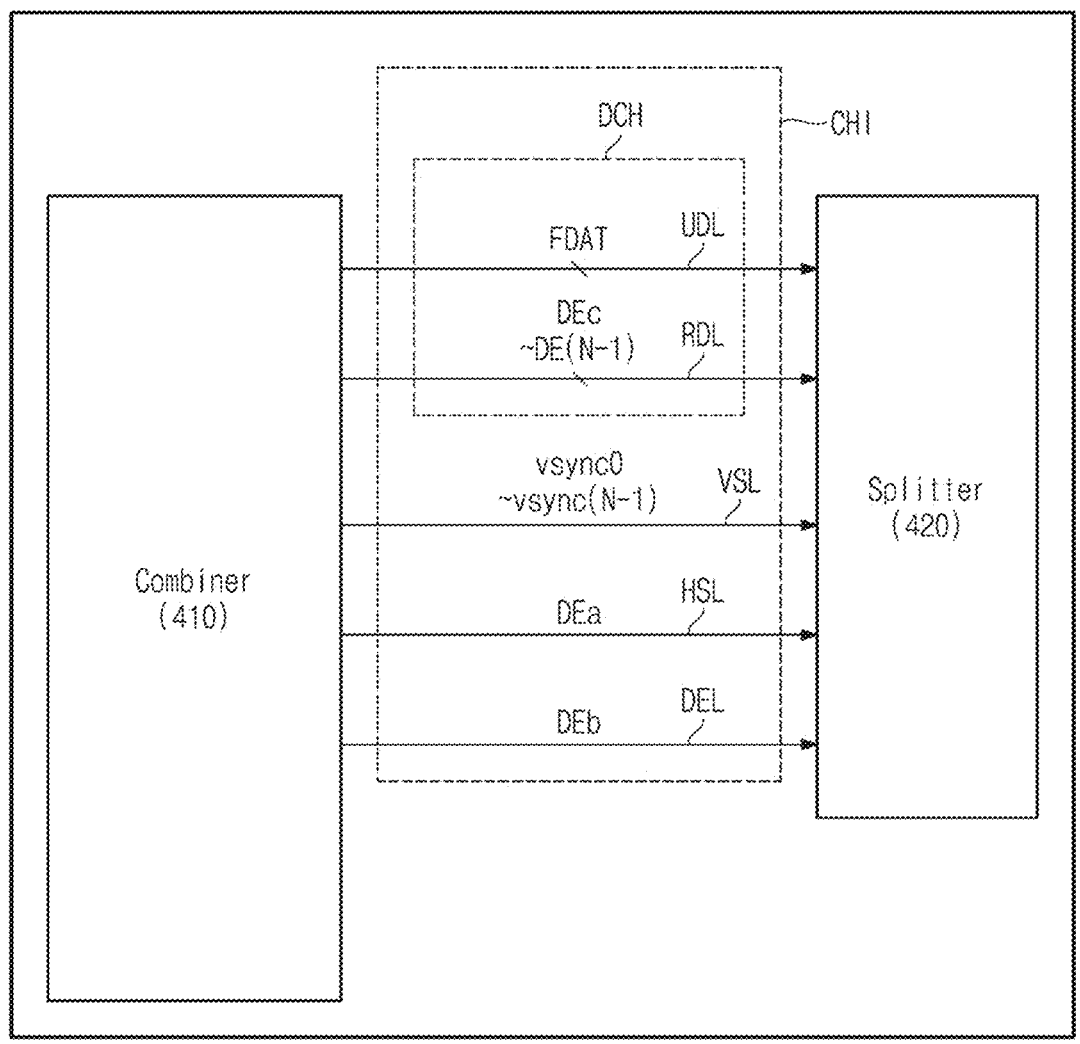
FIG. 9 is a diagram illustrating an image processing device and data channels according to some example embodiments in more detail.

FIG. 9 is a diagram illustrating an image processing device and data channels according to some example embodiments in more detail.

Referring to FIG. 9, a data channel DCH connected between a combiner 410 and a splitter 420 included in the image processing apparatus 400 according to some example embodiments may include a plurality of data lines. For example, the data channel DCH may include m data lines (where m is a positive integer), and m may be defined as a size of first image data. For example, when a size of each first image data is 24 bits, the data channel DCH may include 24 data lines.

A portion of the plurality of data lines may be allocated for output of second image data FDAT, and the remaining data lines may be allocated for a data enable signal. For example, the combiner 410 may output the second image data FDAT to user data lines UDL, n data lines (where n is a positive integer) among the m data lines, and n may be defined as a size of second image data FDAT. For example, when the second image data FDAT having a converted format has a size of n bits, n data lines may be allocated as the user data lines UDL.

Residual data lines RDL, remaining data lines among m data lines excluding the user data lines UDL, may be allocated for the data enable signal. The combiner 410 may output one or more data enable signals among N data enable signals to the remaining data lines among m data lines.

For example, the combiner 410 may output a first data enable signal DEa through a horizontal synchronization line HSL and a second data enable signal DEb through a data enable line DEL. Then, the remaining data enable signals DEc to DEN−1 among N data enable signals may remain.

The combiner 410 may output the remaining data enable signals DEc to DEN−1 through the residual data lines RDL. In addition, the combiner 410 may output a plurality of vertical synchronization signals vsync0 to vsyncN−1 through a vertical synchronization line VSL.

As a result, according to example embodiments, when a data line having a size of data required to transmit the converted second image data FDAT is allocated to the second image data FDAT, the remaining residual data lines RDL may be used to transmit the data enable signal. Therefore, according to example embodiment, the plurality of pieces of first image data DAT0 to DATN−1 may be transmitted without additional lines, channels, or interfaces.

Figure 10:
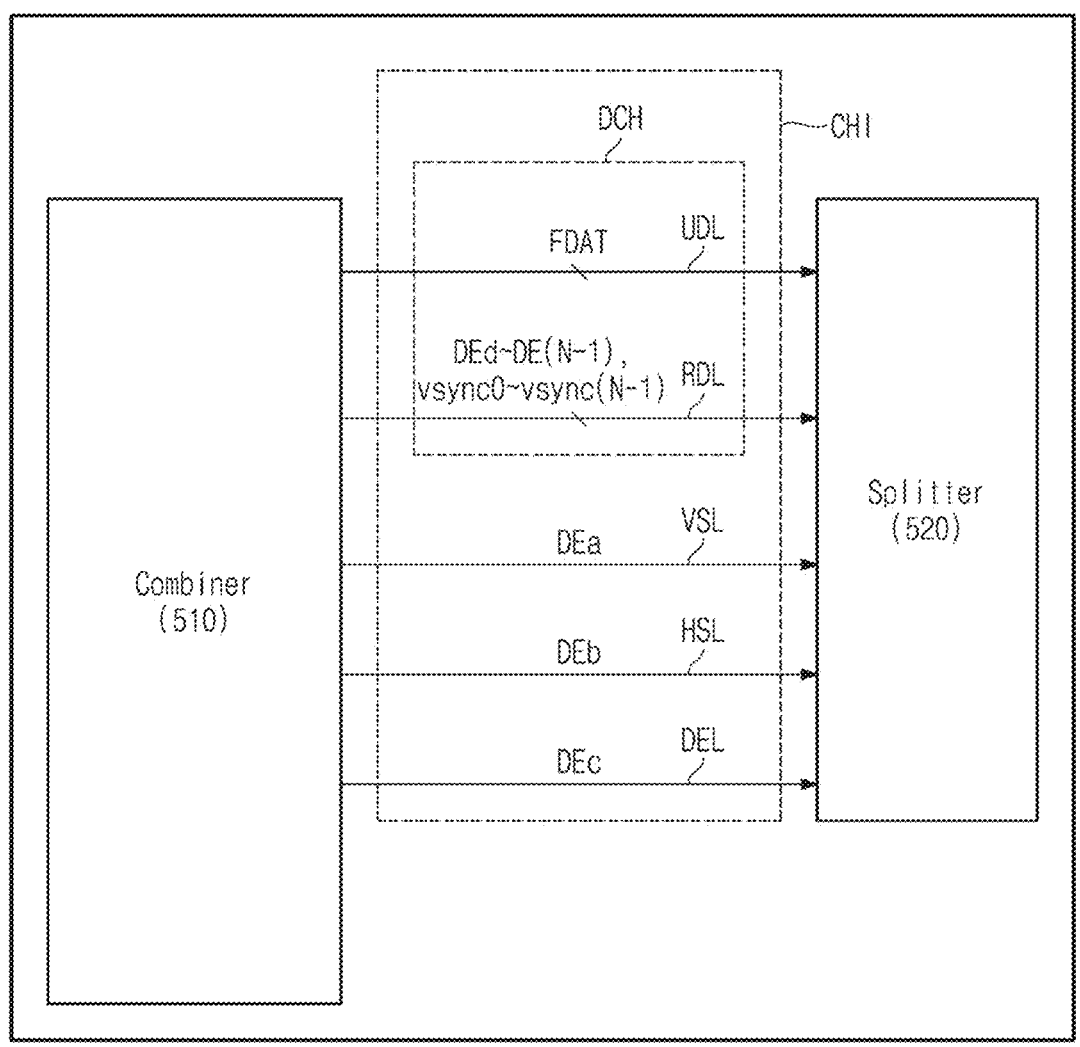
FIG. 10 is a diagram illustrating an image processing device and data channels according to some example embodiments in more detail.

FIG. 10 is a diagram illustrating an image processing device and data channels according to some example embodiments in more detail.

Referring to FIG. 10, a plurality of data lines included in a data channel DCH connected between a combiner 510 and a splitter 520 in the image processing device 500 according to some example embodiments may include user data lines UDL and residual data lines RDL, similarly to the description provided in FIG. 9. The user data line UDL is allocated for second image data FDAT, and the residual data line RDL may be allocated for data enable signal DEd to DEN−1 and/or vertical synchronization signals vsync0 to vsyncN−1. For example, the residual data line RDL may be used to output not only the data enable signal but also the vertical synchronization signal vsync0 to vsyncN−1, as described above in FIG. 9.

According to some example embodiments, all of the N vertical synchronization signals vsync0 to vsyncN−1 may be allocated to the residual data line RDL as illustrated in the drawing, or a portion of N vertical synchronization signals vsync0 to vsyncN−1 may be allocated to the residual data line RDL. When all of the vertical synchronization signals vsync0 to vsyncN−1 are allocated to the residual data line RDL, the vertical synchronization line VSL may be allocated to a data enable signal.

For example, the combiner 510 may output a first data enable signal DEa through the vertical synchronization line VSL. In addition, the combiner 510 may output a second data enable signal DEb through the horizontal synchronization line HSL, and the third data enable signal through the data enable line DEL. Then, the remaining data enable signals DEd to DEN−1, among the N data enable signals, may remain. The combiner 510 may output the remaining data enable signals DEd to DEN−1 through the residual data line RDL.

As described in the above embodiments, the vertical synchronization signal vsync0 to vsyncN−1 and the data enable signal may be output through various lines included in the channel interface CHI.

Figure 11:
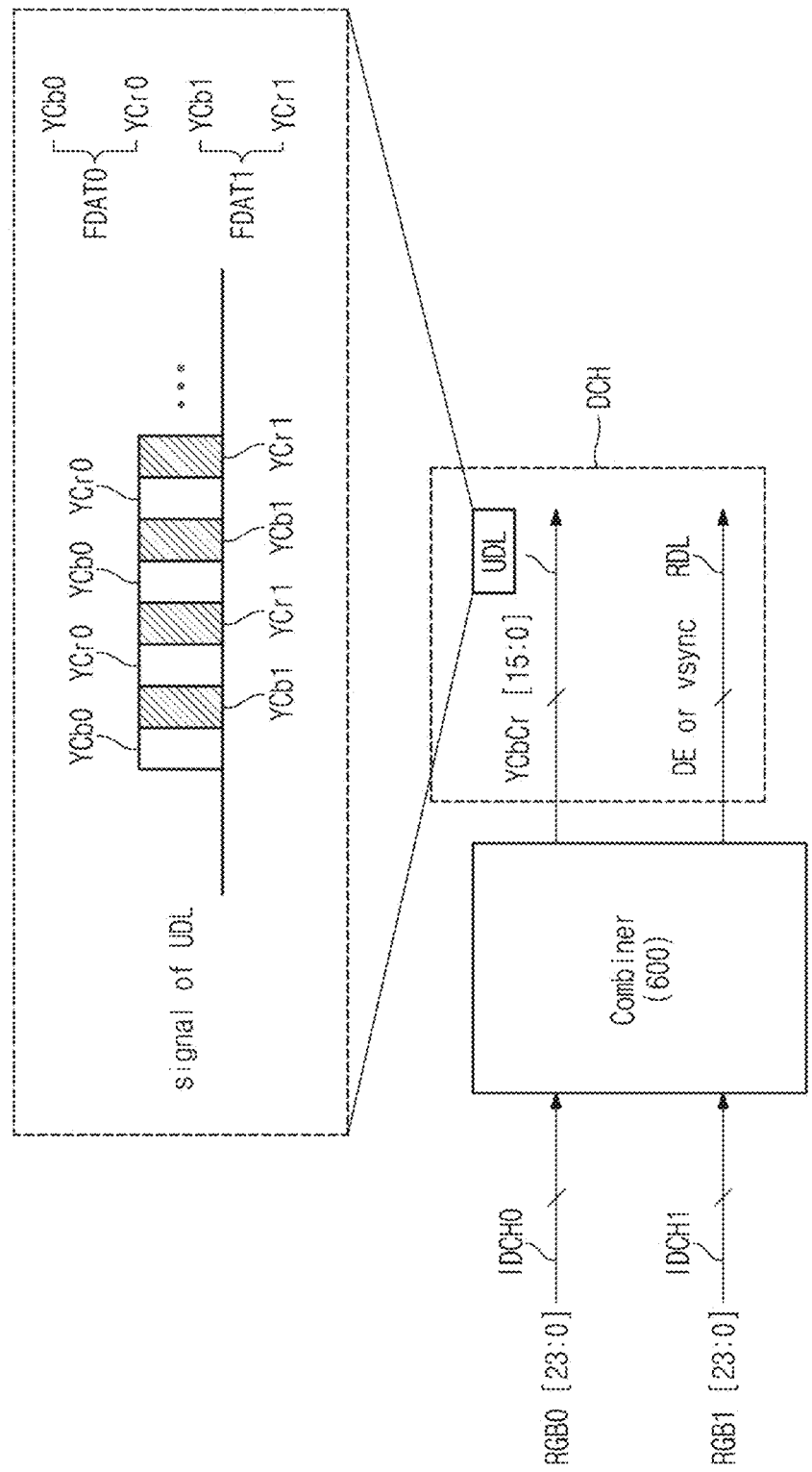
FIG. 11 is a diagram illustrating a combiner processing image data having an exemplary format.

FIG. 11 is a diagram illustrating a combiner processing image data having an exemplary format.

Referring to FIG. 11, for example, first image data in a Red-Green-Blue (RGB) format includes RGB0[23:0] and RGB1[23:0] may have an RGB format, and second image data YCbCr[15:0] may have a YCbCr format, in which "Y" represents Luminence, "Cb" represents Blue Chrominance difference, and "Cr" represents Red Chrominance difference. For example, the first image data RGB0[23:0] and RGB1[23:0] having the RGB format may have a size of 24 bits, and the second image data YCbCr[15:0] having the YCbCr format may have a size of 16 bits.

A combiner 600 may receive the first image data RGB0[23:0] and RGB1[23:0] through first input data channels IDCH0 and IDCH1, and the second image data YCbCr[15:0] through second input data channels IDCH0 to IDCHN−1. Each of the input data channel IDCH0 and IDCH1 may have a size of 24 bits.

The combiner 600 may convert two pieces of first image data RGB0[23:0] and RGB1[23:0] into the second image data YCbCr[15:0] having the YCbCr format, and may output the second image data YCbCr[15:0] through a user data line UDL of a data channel DCH. For example, the combiner 600 may convert the second image data YCbCr[15:0] to have a YCbCr 422 format. In some embodiments, the converted second image data YCbCr[15:0] may include YCb data and YCr data corresponding to the YCbCr format. Each of the YCb data and YCr data may have a size of 16 bits. When a size of the user data line UDL is 16 bits, the user data line UDL may transmit a single piece of YCb data or a single piece of YCr data.

Accordingly, the combiner 600 may time-divide and output 2-1-th image data FDAT0 corresponding to 1-1-th image data and 2-2-th image data FDAT1 corresponding to 1-2-th image data and YCb data, and YCr data YCb0 and YCr0 included in the 2-1-th image data FDAT0 and YCb data and YCr data YCb1 and YCr1 included in the 2-2-th image data FDAT1 through the user data line UDL.

For example, the combiner 600 may time-divide and output the 2-1-th image data FDAT0 and the 2-2-th image data FDAT1, but unit data of each image data, the YCb data and the YCr data, may also be output to be time-divide.

As a result, according to example embodiments, the transmission of the second image data YCbCr[15:0] may be performed through the user data line UDL, allowing 16 bits of data to be transmitted at a time, by time-dividing the second image data YCbCr[15:0] based on the data type (for example, the 2-1-th image data FDAT0 and the 2-2-th image data FDAT1) and unit (for example, the YCb data and the YCr data).

In the data channel DCH having a size of 24 bits, the remaining 8 bits of the residual data line RDL, excluding the 16 bits of the user data line UDL for transmission of the second image data YCbCr[15:0], may be allocated for a data enable signal DE and/or a vertical synchronization signal vsync.

Figure 12:
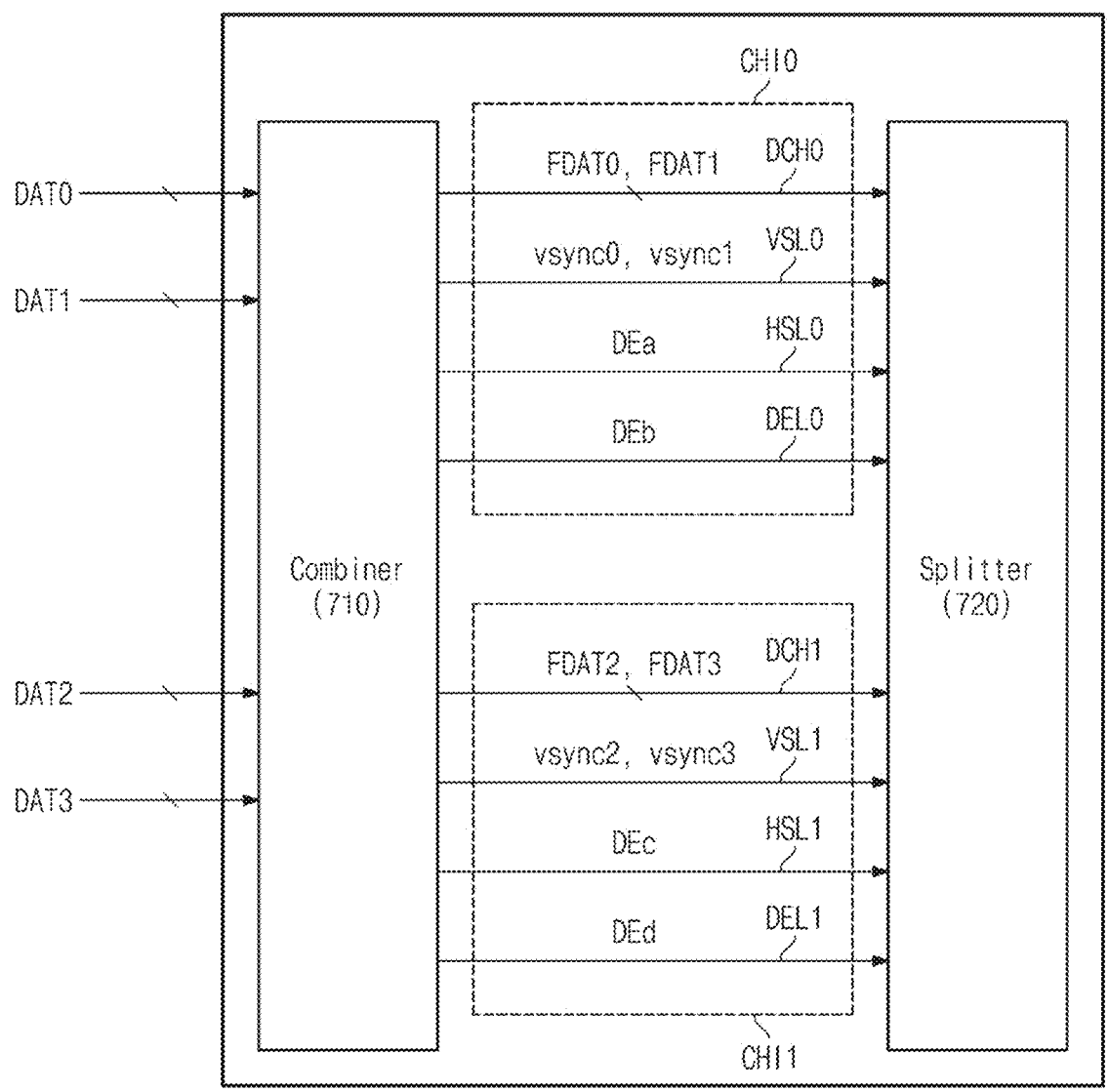
FIG. 12 is a diagram illustrating an image processing device including a plurality of channel interfaces according to some example embodiments.

FIG. 12 is a diagram illustrating an image processing device including a plurality of channel interfaces according to some example embodiments.

Referring to FIG. 12, an image processing device 700 may include a plurality of channel interfaces CHI0 and CHI1. Each of the channel interfaces CHI0 and CHI1 may include a data channel DCH, vertical synchronization lines VSL0 and VSL1, horizontal synchronization lines HSL0 and HSL1, and data enable lines DEL0 and DEL1.

Each of the channel interfaces CHI0 and CHI1 may output second image data FDAT, data converted from a plurality of pieces of first image data DAT0 to DAT3, from a combiner 710 to a splitter 720. For example, the first channel interface CHI0 may include a first data channel DCH0 for outputting second image data FDAT0 and FDAT1 converted from the plurality of pieces of first image data (for example, 1-1-th image data DAT0 and 1-2-th image data DAT1), a first vertical synchronization line VSL0 for outputting vertical synchronization signals vsync0 and vsync1 corresponding to the plurality of pieces of first image data, a first horizontal synchronization line HSL0 for outputting a first data enable signal DEa and a second data enable signal DEb for the plurality of pieces of first image data, and a first data enable line DEL0.

For example, the second channel interface CHI1 may include a second data channel DCH1 for outputting second image data FDAT2 and FDAT3 converted from a plurality of pieces of first image data (for example, 1-3-th image data DAT2 and 1-4-th image data DAT3), a second vertical synchronization line VSL1 for outputting vertical synchronization signals vsync2 and vsync3 corresponding to the plurality of pieces of first image data, a second horizontal synchronization line HSL1 for outputting a third data enable signal DEc and a fourth data enable signal DEd for the plurality of pieces of first image data, and a second data enable line DEL1.

The combiner 710 may convert, combine, and output the second image data FDAT0 to FDAT3 in consideration of a maximum transmittable data size of each of the channel interfaces CHI0 and CHI1. For example, when a data channel DCH0 of the channel interface CHI0 and a data channel DCH1 of the channel interface CHI1 are each able to transmit second image data FDAT0 to FDAT3 converted from two pieces of first image data as illustrated in the drawing, the combiner 710 may allocate and output each of the second image data FDAT0 to FDAT3 and control signals (two vertical synchronization signals and two data enable signals) associated with the second image data FDAT0 to FDAT3 to the channel interfaces CHI0 and CHI1, respectively.

Example embodiments are not limited to FIG. 12. Therefore, a size of the second image data transmittable through each channel interface, the number of vertical synchronization signals, and the number of data enable signals may be further expanded depending on the implementation of a channel interface when a plurality of channel interfaces are provided. When the number of required data enable signals increases as a size of the transmittable second image data FDAT increases, additional data enable signals other than the data enable signals illustrated in the drawing may be transmitted through the residual data line according to the above-described embodiments.

Figure 13:
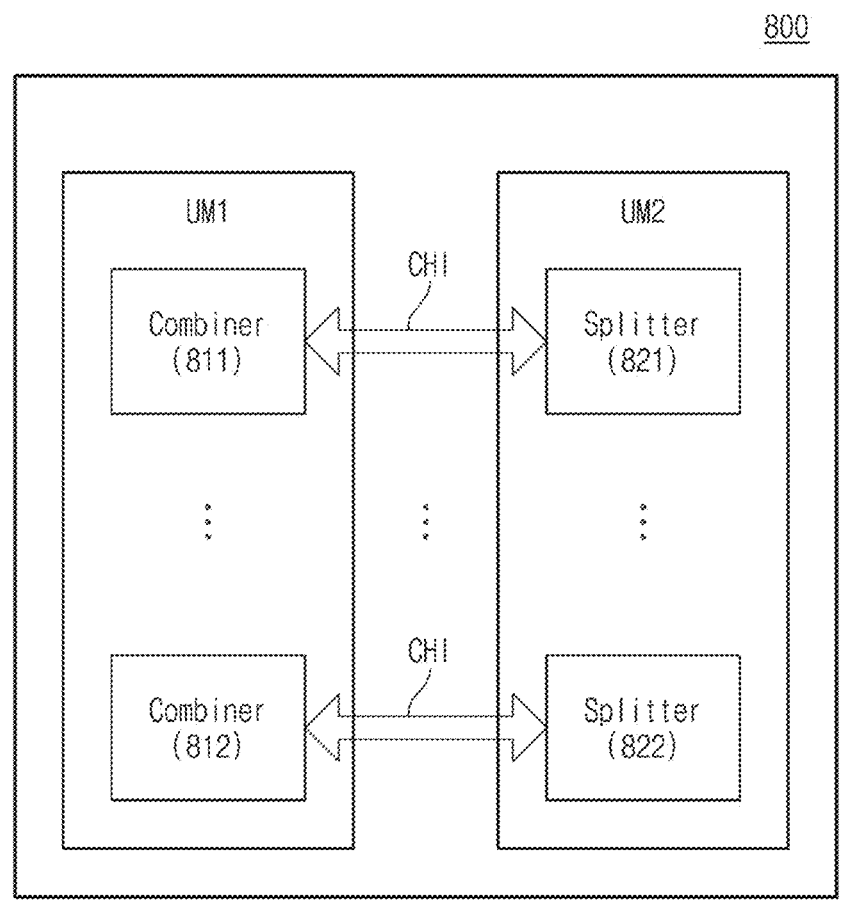
FIG. 13 is a diagram illustrating an image processing device including a plurality of channel interfaces and a plurality of combiners according to some example embodiments.

FIG. 13 is a diagram illustrating an image processing device including a plurality of channel interfaces and a plurality of combiners according to some example embodiments.

Referring to FIG. 13, according to some example embodiments, a plurality of combiners 811 and 812 and/or splitters 821 and 822 may be provided. For example, the combiners 811 and 812 and/or splitters 821 and 822 may be provided as many as the number of channel interfaces CHI.

A plurality of combiners 811 and 812 may be provided in a single unit module (for example, a first unit module UM1), and a plurality of splitters 821 and 822 may be provided in a single unit module (for example, a second unit module UM2). According to example embodiments, the first unit module UM1 may include a single combiner 811 or 812, and the second unit module UM2 may include a plurality of splitters 821 and 822. Alternatively, the first unit module UM1 may include a plurality of combiners 811 and 812, and the second unit module UM2 may include a single splitter 821 or 822.

Each of the combiners 811 and 812 may be connected to a single splitter 821 or 822 through a single channel interface CHI, and may perform reception of first image data and a control signal, format conversion and combination of the first image data, outputting of second image data and a control signal, or the like.

Figure 14:
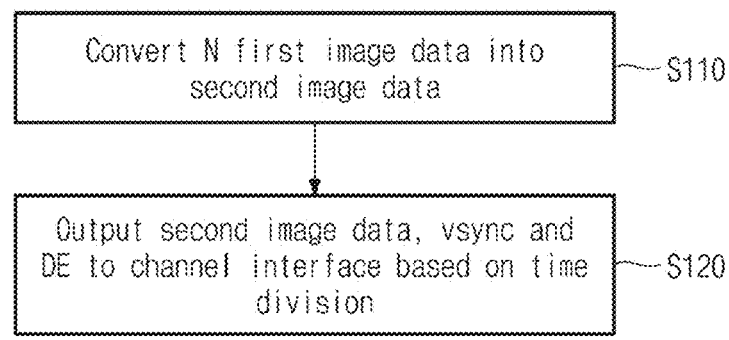
FIG. 14 is a flowchart illustrating a method of operating an image processing device according to some example embodiments.

FIG. 14 is a flowchart illustrating a method of operating an image processing device according to some example embodiments.

Referring to FIG. 14, in operation S110, the image processing device may convert N pieces of first image data into second image data having a different image format. For example, the image processing device may convert first image data having an RGB format into second image data having a YCbCr format. The N pieces of first image data may be combined with each other to be converted into the second image data based on the conversion of the image format.

In operation S120, the image processing device may output the converted second image data to a data channel based on time division. According to the time division, second image data and first image data, different from each other, may be alternately output through a single data channel.

According to some example embodiments, the method of operation the image processing device may further include an operation of receiving the second image data and an operation of decoding the second image data to obtain N pieces of first image data.

Figure 15:
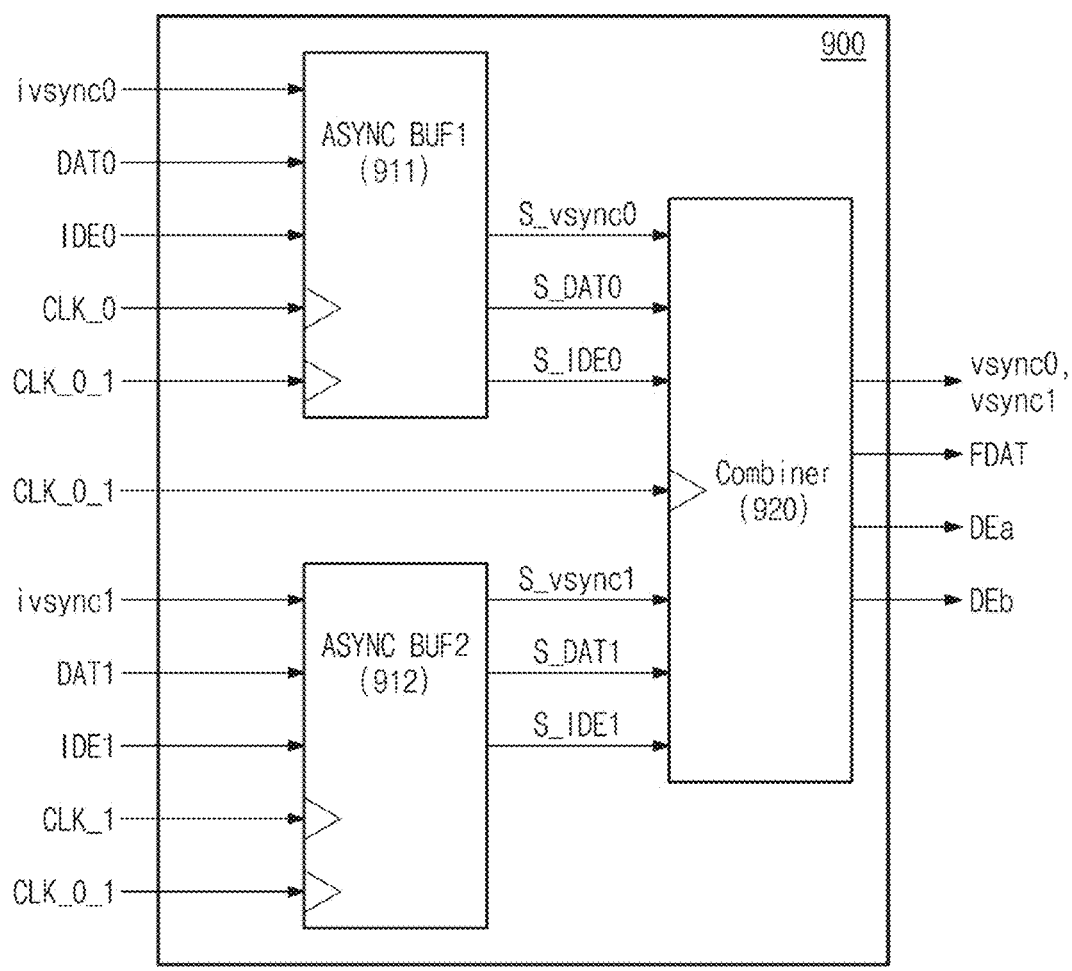
FIG. 15 is a diagram illustrating an image processing device including an asynchronous buffer according to some example embodiments.

FIG. 15 is a diagram illustrating an image processing device including an asynchronous buffer according to some example embodiments.

Referring to FIG. 15, according to some example embodiments, an image processing device 900 may include a plurality of asynchronous buffers 911 and 912. For example, the asynchronous buffers 911 and 912 may be provided as many as N pieces of first image data DAT0 and DAT1. Each of the asynchronous buffers 911 and 912 may be connected to an input terminal of a combiner 920. FIG. 15 illustrates the case in which N=2 for ease of description, but example embodiments are not limited thereto.

The asynchronous buffer 911 and 912 may receive input vertical synchronization signals ivsync0 and ivsync1, first image data DAT0 and DAT1, input data enable signals IDE0 and IDE1, a first clock signal allocated for the first image data DAT0 and DAT1, and a second clock signal CLK_0_1 allocated for second image data FDAT from a unit module within the image processing device 900 or a host, not illustrated, connected to the image processing device 900.

The asynchronous buffers 911 and 912 may synchronize timings the input vertical synchronization signals ivsync0 and ivsync1, the first image data DAT0 and DAT1, and the input data enable signals IDE0 and IDE1 with timing of the second clock signal CLK_0_1, based on the timing of the first clock signal being misaligned. The asynchronous buffers 911, 912 may output the synchronized vertical synchronization signals S_vsync0 and S_vsync1, the synchronized first image data S_DAT0 and S_DAT1, and the synchronized input data enable signal S_IDE0 and S_IDE1 to the combiner 920.

The combiner 920 may receive the synchronized vertical synchronization signals S_vsync0 and S_vsync1, the synchronized first image data S_DAT0 and S_DAT1, and the synchronized input data enable signals S_IDE0 and S_IDE1 from the asynchronous buffers 911 and 912, and may receive the second clock signal CLK_0_1 from a unit module within the image processing device 900 or a host, not illustrated, connected to the image processing device 900. The combiner 920 may combine and convert the synchronized first image data S_DAT0, S_DAT1, received from each of the asynchronous buffers 911 and 912, into second image data FDAT based on the second clock signal CLK_0_1. In addition, the combiner 920 may convert the synchronized input data enable signals S_IDE0 and S_IDE1 into data enable signals DEa and DEb for the second image data FDAT and output the data enable signals DEa and DEb. In addition, the combiner 920 may combine the synchronized vertical synchronization signals S_vsync0 and S_vsync1 to output the combined vertical synchronization signals vsync0 and vsync1.

Figure 16:
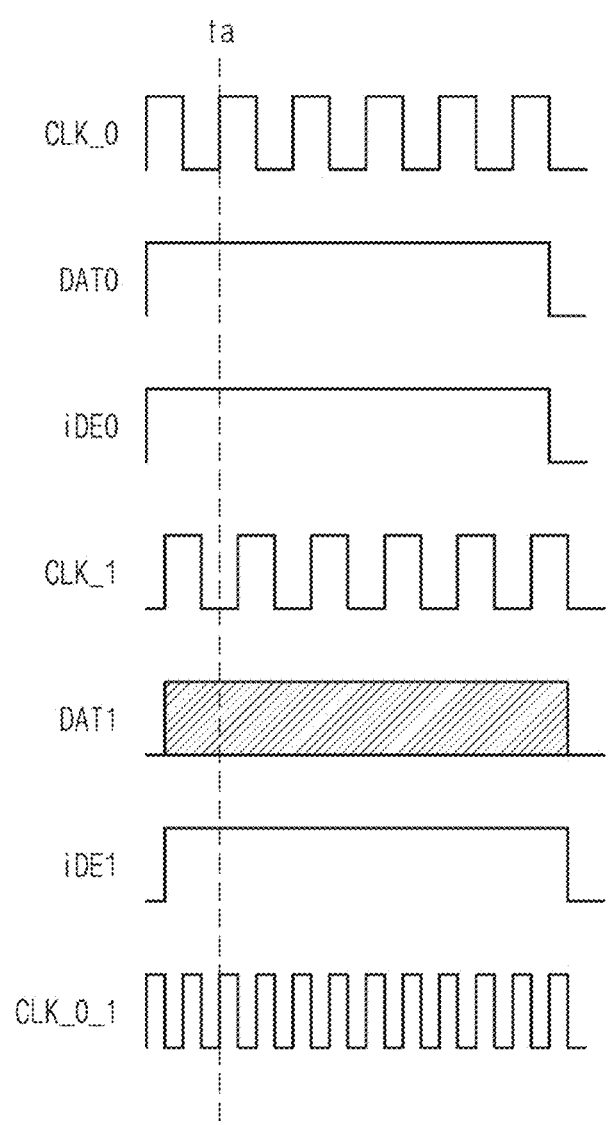
FIGS. 16 and 17 are diagrams illustrating an operation of the image processing device, based on the asynchronous buffer of FIG. 15 according to some example embodiments.
Figure 17:
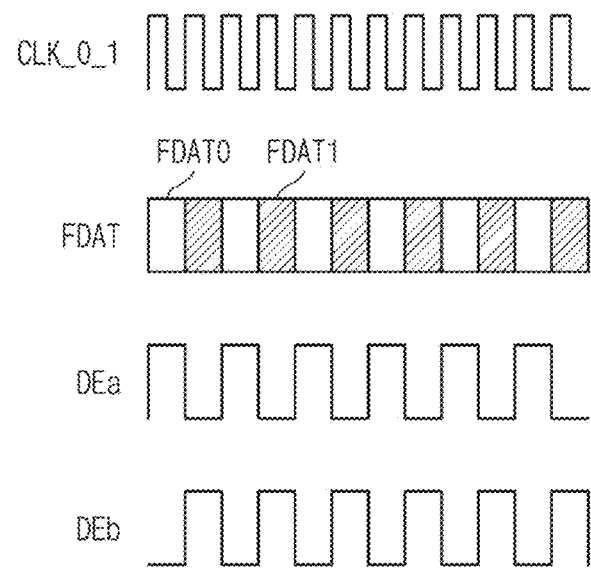

FIGS. 16 and 17 are diagrams illustrating an operation of the image processing device, based on the asynchronous buffer of FIG. 15 according to some example embodiments.

Referring to FIGS. 15 and 16, timings of a 1-2-th clock signal CLK_1, 1-2-th image data DAT1, and a second input data enable signal IDE1, input to the second asynchronous buffer 912, may not be synchronized with timings of a 1-1-th clock signal CLK_0, a 1-1-th image data DAT0, and a first input data enable signal IDE0 input to the first asynchronous buffer 911. In an example embodiment, the 1-1-th clock signal CLK_0 and the 1-2-th clock signal CLK_1 may have a frequency of f1 (where f1 is a real number).

When the timing of the 1-1-th clock signal CLK_0 is normal, it may be necessary to synchronize the timing of the other clock signals, related data (first image data), and an input data enable signal, which are not normal.

The second clock signal CLK_0_1 may be input to the asynchronous buffer to perform synchronization processing of the asynchronous buffer. The second clock signal CLK_0_1 may have a frequency corresponding to the product of k (where k is a positive integer) and f1, the number of first clock signals. For example, when there are two asynchronous buffers as illustrated in FIGS. 15 and 17, the second clock signal CLK_0_1 may have a frequency of 2f1. The second clock signal CLK_0_1 may be used as a reference clock signal for synchronization.

As a result, the frequency of the second clock signal CLK_0_1 may have a relationship of 1:k with the frequency of the first clock signal. This is because the combiner is allowed to time-divide and output the second image data FDAT to a single data channel DCH, as described above.

The second asynchronous buffer 912 may synchronize timings of a 1-2-th clock signal CLK_1, 1-2-th image data, and a second input data enable signal input based on a 1-1-th clock signal CLK_0 and a second clock signal CLK_0_1. For example, at an arbitrary time point ta, the second asynchronous buffer 912 may process the 1-2-th clock signal CLK_1 based on the second clock signal CLK_0_1 such that the 1-2-th clock signal CLK_1 matches the 1-1-th clock signal CLK_0 on a time domain. Along with the processing of the 1-2-th clock signal CLK_1, timings of the 1-2-th image data and the second data enable signal DEb may also be synchronized. Accordingly, timings of the synchronized 1-2-th image data S_DAT1 and the second input data enable signal S_IDE1 may be synchronized with timings of the 1-1-th image data DAT0 and the first input data enable signal IDE0.

Referring to FIGS. 15 and 17, the combiner may combine and convert the 1-1-th image data and the 1-2-th image data into the second image data FDAT based on the second clock signal CLK_0_1. The second image data FDAT may have time-divided regions FDAT0 and FDAT1 corresponding to each first image data. In addition, the combiner may output a first data enable signal DEa and a second data enable signal DEb corresponding to each time-divided region.

The image processing device according to the above-described embodiments may synchronize the asynchrony through an asynchronous buffer when timings of the input first image data and the control signal and clock signal for the first image data are misaligned.

Figure 18:
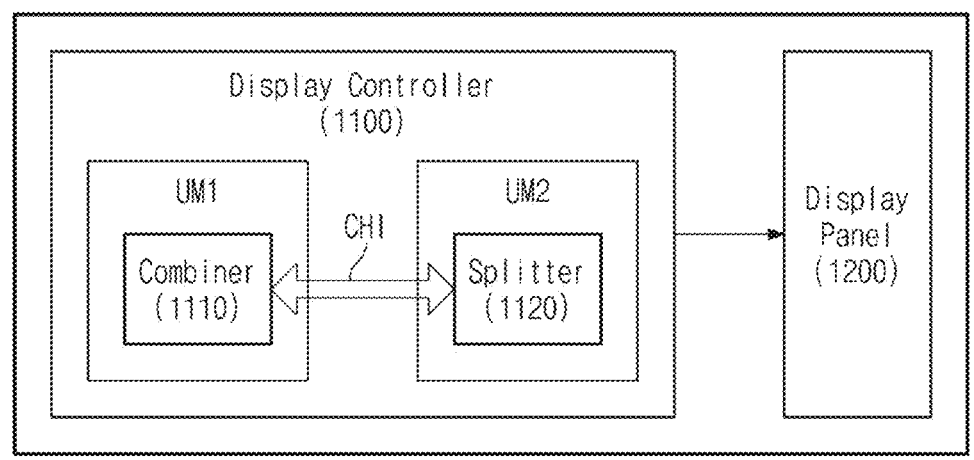
FIG. 18 is a diagram illustrating a display device according to some example embodiments.

FIG. 18 is a diagram illustrating a display device according to some example embodiments.

Referring to FIG. 18, a display device 1000 may include a display controller 1100 and a display panel 1200.

The display controller 1100 may control the overall operation of the display device 1000. The display controller 1100 may generate input image data to be displayed on the display panel 1200 and a control command to control the display device 1000. For example, the control command may include setting information on brightness, gamma, frame rate, operation mode of a display drive circuit, or the like. The display controller 1100 may process the input image data based on a clock signal and/or various synchronization signals. The input image data may include frame data corresponding to each of a plurality of frames.

In some example embodiments, the display controller 1100 may be implemented as various types of processors such as a central processing unit (CPU), a graphics processing unit (GPU), a microprocessor, a multimedia processor, or an application processor. Alternatively, the display controller 1100 may be implemented as an integrated circuit (IC) or a system-on-chip (SoC).

The display controller 1100 may include a first unit module UM1, including a combiner according to the above-described some example embodiments, and a second unit module UM2 including a splitter. The first unit module UM1 and the second unit module UM2 may be connected to each other through a channel interface CHI according to the above-described some example embodiments. Each unit module may perform various functions to process input image data.

According to some example embodiments, each unit module may exchange image data with the other unit module through the channel interface CHI to process input image data. According to the above-described embodiments, the channel interface CHI may include a data channel, a vertical synchronization line, a horizontal synchronization line, and a data enable line to output image data. The combiner included in the first unit module may convert N pieces of first image data into second image data having a different image format, and time-divide and output the second image data to the channel interface. The splitter included in the second unit module may receive and decode the second image data.

The display controller 1100 may convert the input image data into an analog signal for driving the display panel 1200, and provide the converted analog signal to the display panel 1200.

The display panel 1200 may be a display unit on which an actual image is displayed, and may be one of display devices, receiving image signals transmitted electrically and displaying two-dimensional images, such as a thin film transistor liquid crystal display (TFT-LCD), an organic light emitting diode (OLED) display, a field emission display, or a plasma display panel (PDP).

As set forth above, image processing device and method for transmitting and receiving a larger number of pieces of image data using a channel interface may be provided.

Example embodiments have been described above with the aid of method steps illustrating the performance of specified functions and relationships thereof. The boundaries and sequence of these functional building blocks and method steps have been defined herein for convenience of description. Alternate boundaries and sequences can be defined, so long as the specified functions and relationships are appropriately performed. Any such alternate boundaries or sequences are thus within the scope and spirit of the claims.

As used herein, expressions such as "at least one of," when preceding a list of elements, modify the entire list of elements and do not modify the individual elements of the list. Thus, for example, both "at least one of A, B, or C" and "at least one of A, B, and C" mean either A, B, C or any combination of two or more of A, B, and C. Likewise, A and/or B means A, B, or A and B.

Any functional blocks shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The units and/or modules described herein may be implemented using hardware components or a combination of software components and hardware component. For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. the processor may be a hardware processor such as central processing unit (CPU), a multi-processor, a distributed processing system, an application specific integrated circuit (ASIC), and/or a suitable hardware processing unit. The processing device(s) may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors, multi-core processors, distributed processing, or the like, that when executing instructions according to firmware or software configure the processing device as a special purpose computer for controlling one or more operations thereof.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, and/or computer storage medium or device. The software also may be distributed over network coupled computer systems so that the software is stored and executed in a distributed fashion. The software and data may be stored by one or more computer readable recording mediums.

While example embodiments have been shown and described above, it will be apparent to those skilled in the art that modifications and variations could be made without departing from the scope of the present inventive concept as defined by the appended claims.

What is claimed is:

1. An image processing device comprising:
a channel interface comprising a data channel, a vertical synchronization line, a horizontal synchronization line, and a data enable line; and
a combiner coupled to the channel interface and configured to
convert N pieces of first image data, where N is a positive integer greater than or equal to 2, into second image data having a different image format,
time-divide and output the second image data to the data channel,
output N vertical synchronization signals for the second image data to the vertical synchronization line, and
output N data enable signals for the second image data to the horizontal synchronization line and the data enable line.

2. The image processing device of claim 1, wherein
the combiner is configured to convert the second image data to an image format with a smaller size than a size of the first image data.

3. The image processing device of claim 1, wherein
the combiner is configured to output a first data enable signal, among the N data enable signals, to the horizontal synchronization line, and
output a second data enable signal, among the N data enable signal, to the data enable line.

4. The image processing device of claim 1, wherein
the data channel comprises m data lines, where m is a positive integer, and
m is defined as a size of a single piece of the N pieces of the first image data.

5. The image processing device of claim 4, wherein
the combiner is configured to output the second image data to n data lines, where n is a positive integer, among the m data lines, and
n is defined as a size of a single piece of the second image data.

6. The image processing device of claim 5, wherein
the combiner is configured to output at least one of the N data enable signals to at least one remaining data line, among the m data lines.

7. The image processing device of claim 1, wherein
the N vertical synchronization signals have different numbers of pulses.

8. The image processing device of claim 1, wherein
the combiner is configured to delay one of the N vertical synchronization signals by a predetermined amount of time based on two vertical synchronization signals, among the N vertical synchronization signals, overlapping each other.

9. The image processing device of claim 1, wherein
the first image data has an RGB format and the second image data has a YCbCr format.

10. The image processing device of claim 9, wherein
the second image data comprises YCb data and YCr data corresponding to the YCbCr format, and
the combiner is configured to alternately output the YCb data and the YCr data to the data channel in a time domain.

11. The image processing device of claim 1, further comprising:
an asynchronous buffer connected to an input of the combiner and configured to receive the first image data, a first clock signal allocated for the first image data and a second clock signal allocated for the second image data and synchronize the first image data with the second clock signal based on the first clock signal being desynchronized.

12. The image processing device of claim 11, wherein the asynchronous buffer is provided in N.

13. An image processing device comprising:
a channel interface comprising a data channel, a vertical synchronization line, a horizontal synchronization line, and a data enable line;
a combiner coupled to the channel interface and configured
to convert N pieces of first image data, where N is a positive integer greater than or equal to 2, into second image data having a different image format,
time-divide and output the second image data to the data channel,
output N vertical synchronization signals for the second image data to the vertical synchronization line, and
output N data enable signals for the second image data to the horizontal synchronization line and the data enable line; and
a splitter coupled to the channel interface and configured to
receive the second image data through the data channel,
receive the N vertical synchronization signals through the vertical synchronization line, and
receive the N data enable signals through the horizontal synchronization line and the data enable line.

14. The image processing device of claim 13, wherein the splitter is configured to decode the second image data to obtain the N pieces of first image data.

15. The image processing device of claim 13, wherein the second image data has an image format with a smaller size than a size of the first image data.

16. The image processing device of claim 13, wherein the data channel comprises m data lines, where m is a positive integer, and m is defined as a size of a single piece of first image data, and
the splitter is configured to receive the second image data from n data lines, where n is a positive integer, among the m data lines, and n is defined as a size of a single piece of the second image data.

17. The image processing device of claim 16, wherein the splitter is configured to receive at least one of the N data enable signals from remaining data lines, among the m data lines.

18. A method performed by an image processing device, the method comprising:
converting N pieces of first image data, where N is a positive integer greater than or equal to 2, into second image data having a different image format;
time-dividing and outputting the second image data to a data channel;
outputting N vertical synchronization signals for the second image data to a vertical synchronization line; and
outputting N data enable signals for the second image data to a horizontal synchronization line and a data enable line.

19. The method of claim 18, further comprising:
receiving the second image data; and
decoding the second image data to obtain the N pieces of first image data.

20. The method of claim 18, wherein the second image data has an image format with a smaller size than a size of the first image data.

* * * * *